Nov. 6, 1962 T. S. KOEPFINGER 3,062,299
GRASS EDGER FOR SPRINKLER HEADS
Filed Aug. 15, 1960 2 Sheets-Sheet 1
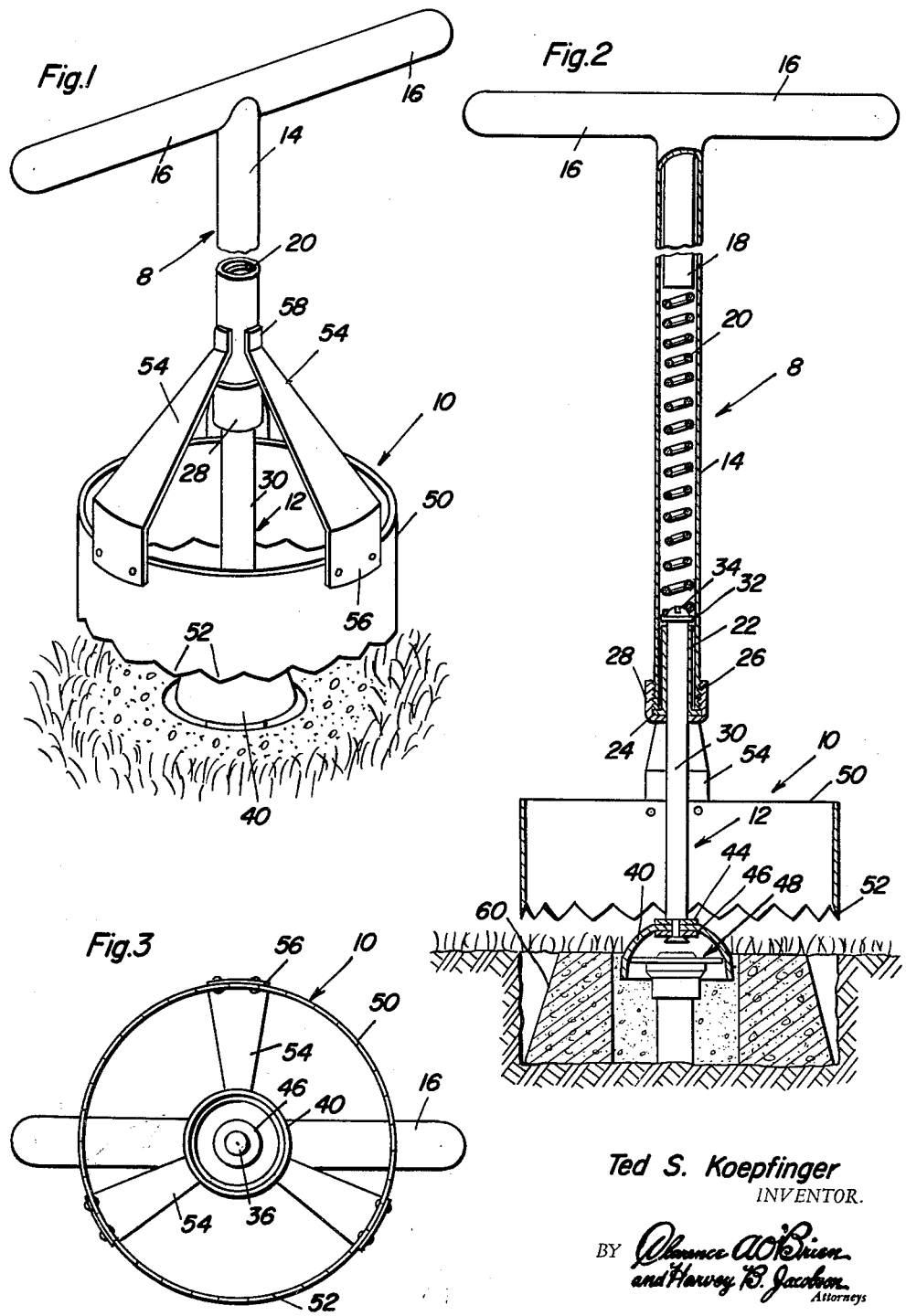
Ted S. Koepfinger
INVENTOR.

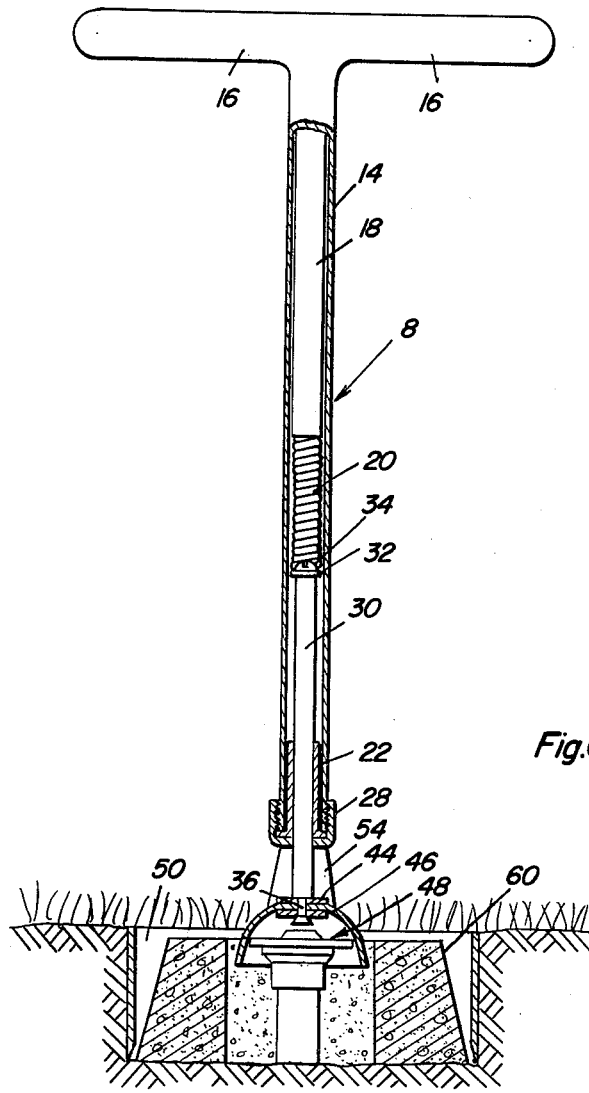
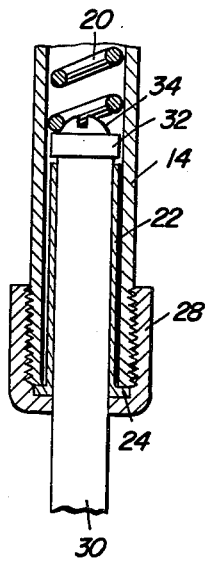
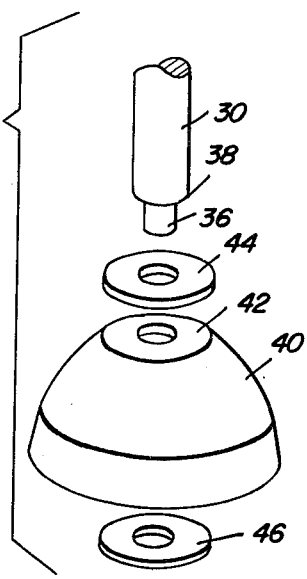
Ted S. Koepfinger
INVENTOR.

United States Patent Office 3,062,299
Patented Nov. 6, 1962

3,062,299
GRASS EDGER FOR SPRINKLER HEADS
Ted S. Koepfinger, 1500 NW. 7th Terrace,
Fort Lauderdale, Fla.
Filed Aug. 15, 1960, Ser. No. 49,611
3 Claims. (Cl. 172—18)

This invention relates to a manually usable edger and trimmer for use with an embedded lawn sprinkler head, particularly the type which is surrounded by a concrete collar commonly referred to as a doughnut, and has reference to an improved implement having a vertically elongated tube or barrel with handle means at the upper end and a push-down cutter head at the bottom.

Persons conversant with trimmers in this field of endeavor are aware that a number of trimmers are being offered which are constructed along the line stated above. It follows that the instant effort has to do with certain new and useful improvements worthy of adoption and use.

One improvement pertains to a simple, practical and economical handle and reach construction which is characterized by a vertically elongated tube or barrel having an integral cross head on the upper end providing handle means. The lower end of the barrel is equipped with a readily applicable and removable bushing and the intermediate portion of the barrel, that is, the bore thereof, houses a coil spring. By providing a filler in the upper portion of the bore a relatively short economical spring which is capable of expedient insertion and replacement may be used.

Another improvement resides in the cutter head. This is a simple arrangement which embodies an endless ring the lower edge of which is serrated with the serrations sharpened and providing cutting teeth. This ring is spaced below the lower end of the barrel by way of outwardly and downwardly inclined arms, the upper ends of the arms being attached to the barrel and the lower ends to the upper edge portion of the ring. This arrangement allows the site of operation to be observed at all times. Most prior art devices do not provide this practical easy-to-use feature.

A further improvement has to do with the aligning and centering means. This means embodies a rod slidable in the bearing or bushing with its upper end coacting with the lower end of the coil spring. The lower end of the rod has a concavo-convex cup attached thereto which hoods over the sprinkler head and effectively locates the implement whereby the cutter head is effectively pushed down and used without striking or colliding with the aforementioned concrete collar.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective, with a portion of the barrel broken away, illustrating the improved trimmer or edger and showing how it is to be used.

FIG. 2 is a view in section and elevation illustrating all of the essential elements or parts.

FIG. 3 is a bottom plan view.

FIG. 4 is a view in section and elevation similar to FIG. 3 but showing the cutter head in the intended cutting and edging position.

FIG. 5 is an enlarged fragmentary view with parts in section and elevation detailing the bushing or bearing.

FIG. 6 is an exploded perspective view showing the aligning or centering cup and its directly associated parts.

The handling means is denoted as an entity by the numeral 8, the cutter head means at 10, and the aligning and centering means at 12.

The means 8 as already suggested comprises a vertically elongated tube, cylinder or hollow barrel 14 of suitable material and length. Inasmuch as the parts in a device or implement such as is under consideration are subject to the reaction of water, it will be understood that non-corrodible materials will be used. The upper closed end of the barrel is provided with a cross member defining a sort of a T and this cross member provides the handle means or hand-grips 16. The element 18 telescopes into the upper end of the bore and is a space saver and may be described as a filler and also a stop for the upper convolution of the coil spring 20. This spring as shown is housed in the bore of the barrel. The bearing means at the bottom of the barrel comprises a sleeve or bushing 22 which is telescoped into the barrel and provided at its bottom with a stop flange 24. The lower end of the barrel is screw-threaded as at 26 to accommodate companion screw-threads on the embracing rim of the cap nut 28. This nut is centrally apertured to permit the passage of the plunger-like guide-rod 30. The upper end of the rod extends into the spring chamber where it is provided with a stop flange 32 held in place by a screw 34. The flange is adapted to abut the upper end of the bushing in an obvious manner. The lower end of the rod (see FIG. 6) is reduced in cross-section to provide a projecting stud 36 and to define a stop shoulder 38. The aforementioned aligning and centering cup 40 is concavo-convex and has a centered hole in its top or crown portion 42 to permit passage of the stud 36. An upper washer 44 surrounds the stud and rests atop a cup and a complemental washer 46 also surrounds the stud on the interior of the cup. The terminal end of the stud is peened or otherwise headed to thus assemble the cup and washers on the stud 36. The cup is such in size that it fits down over the sprinkler head 48 in the manner shown for example, in FIG. 4.

The cutter head is perhaps best shown in FIG. 1. It comprises an annulus or ring 50 of requisite cross-section and diameter. The lower edge portion is serrated and the serrations provided are suitably sharpened to provide the cutting teeth 52. The aforementioned circumferentially spaced downwardly and outwardly inclined braces or arms are denoted at 54 and have their lower end portions laterally bent and riveted or otherwise secured at 56 to the upper edge portion of the ring 50. The upper ends are likewise bent and welded or otherwise secured as at 58 to the lower end portion of the barrel.

As is evident from FIG. 2 the coil spring 20 is normally expanded and therefore raises the handle unit or means 8 to the elevated position shown. Consequently, by lining up the centering cup with the sprinkler head 48 and fitting it over the head in the manner illustrated the device or implement is ready for use. Then, by forcing down on the handle or hand-grips 16 the spring means is compressed and the cutter head rides down to assume the edging and cutting position shown in FIG. 4. It is also evident from FIG. 4 that the cutter head or ring clears the usual concrete collar or doughnut 60 and therefore does not collide therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A grass edger expressly designed and adapted for trimming grass marginally bordering an embedded lawn sprinkler head surrounded by an annular doughnut-type concrete collar comprising: a concavo-convex positioning and orienting cup of an outside diameter that it may be located within the confines of the open center of said collar and capped over and firmly held in an orienting position on the sprinkler head, a guide rod secured at its lower end to the central portion of said cup and rising therefrom, a vertically elongated barrel having an upper end provided with handgrips, an axial bushing confined in the lower open end of said barrel, a cap nut securing the bushing in said lower end of the barrel, an upper portion of said rod sliding upwardly through the cap nut and bushing and telescoping into the bore of the barrel and having a stop washer at its upper end normally resting atop the bushing, a coil spring confined in the bore of the barrel and exerting downward pressure on said stop washer, an open-ended annular ring having a bottom edge provided with grass cutting teeth, said ring being normally spring-biased to assume a plane above the plane of said cup and being of a diameter appreciably greater than the diameter of said cup and having its inner peripheral surface spaced radially from and encircling the cup, and a plurality of spaced arms having upper ends secured to a lower portion of said barrel and inclining outwardly and downwardly from said barrel and having lower ends fixed to the upper edge portion of said ring at circumferentially spaced points.

2. The structure defined in claim 1, and wherein said arms are spaced circumferentially from each other, the intervening spaces being ample and sufficient to permit the user to have an unobstructed view of the aforementioned cup to facilitate piloting it into position in relation to the aforementioned collar and making sure that the ring is properly lined up with the outer margin of the collar to prevent ruinous collision of the cutting teeth with the collar.

3. The structure defined in claim 2, and wherein the lower end of said rod is reduced in cross-section to provide a shoulder and a stud axially centered below the plane of the shoulder, said cup being concavo-convex and having a central portion thereof provided with a hole, said stud extending down through the hole and being provided with inner and outer washers, said washers contacting surfaces of the cup and said stud having a headed end functioning to retain the washers in place and the cup properly assembled on said rod.

References Cited in the file of this patent

UNITED STATES PATENTS

| | | |
|---|---|---|
| 1,857,383 | Johnson | May 10, 1932 |
| 2,935,817 | Maines | May 10, 1960 |
| 2,953,852 | Dehn | Sept. 27, 1960 |

FOREIGN PATENTS

| | | |
|---|---|---|
| 495,216 | Germany | Apr. 3, 1930 |
| 598,340 | Germany | June 9, 1934 |